US012553023B2

(12) United States Patent
Mogna et al.

(10) Patent No.: US 12,553,023 B2
(45) Date of Patent: Feb. 17, 2026

(54) HOMOGENISATION PROCESS FOR THE PREPARATION OF A CELLULAR COMPONENT HOMOGENATE (71) Applicant: PROBIOTICAL S.P.A., Novara (IT)

(72) Inventors: Vera Mogna, Novara (IT); Marco Pane, Novara (IT); Angela Amoruso, Novara (IT)

(73) Assignee: PROBIOTICAL S.P.A., Novara (IT)

( * ) Notice: Subject to any disclaimer, the term of this patent is extended or adjusted under 35 U.S.C. 154(b) by 875 days.

(21) Appl. No.: 17/630,448

(22) PCT Filed: Jul. 30, 2020

(86) PCT No.: PCT/IB2020/057205
§ 371 (c)(1),
(2) Date: Jan. 26, 2022

(87) PCT Pub. No.: WO2021/019491
PCT Pub. Date: Feb. 4, 2021

(65) Prior Publication Data
US 2022/0259550 A1 Aug. 18, 2022

(30) Foreign Application Priority Data
Jul. 30, 2019 (IT) .................. 102019000013356

(51) Int. Cl.
C12N 1/066 (2026.01)
A23L 33/135 (2016.01)
C12N 1/06 (2006.01)
C12N 1/20 (2006.01)

(52) U.S. Cl.
CPC ............ *C12N 1/066* (2013.01); *A23L 33/135* (2016.08); *C12N 1/20* (2013.01); *A23V 2002/00* (2013.01)

(58) Field of Classification Search
None
See application file for complete search history.

(56) References Cited

FOREIGN PATENT DOCUMENTS

CN 101953855 A * 1/2011 ............. A61K 35/74

OTHER PUBLICATIONS

Gaudreau H et al: "The use of crude cellular extracts of *Lactobacillus delbrueckii* ssp. *bulgaricus* 11842 to stimulate growth of a probiotic *Lactobacillus rhamnosus* culture in milk", Enzyme and Microbial Technology, vol. 36, No. 1, Jan. 6, 2005, pp. 83-90. (Year: 2005).*
Fuller Cryo Letters, vol. 25, No. 6, pp. 375-388, 2004 (Year: 2004).*
Huang et al., "Effects of Lactobacilli and an Acidophilic Fungus on the Production Performance and Immune Responses in Broiler Chickens", Poultry Science, 2004, 83: 788-795.
Lanciotti et al., "Potential of high pressure homogenization in the control and enhancement of proteolytic and fermentative activities of some *Lactobacillus* species", Food Chemistry, 2006, 102: 542-550.
Tabanelli et al., "Effects of sub-lethal high-pressure homogenization treatment on the outermost cellular structures and the volatile-molecule profiles of two strains of probiotic lactobacilli", Frontiers in Microbiology, 2015, 6: XP55684108, Lausanne ISSN: 1664-302X, DOI: 10.3389/fmicb.2015.01006.

* cited by examiner

Primary Examiner — Jana A Hines
Assistant Examiner — Khatol S Shahnan Shah
(74) Attorney, Agent, or Firm — James S. Keddie; Bozicevic, Field & Francis LLP (57) ABSTRACT The present invention relates to a cellular component homogenate in liquid form, as well as to a cellular component homogenate in solid form, preferably as sprayed powder. Furthermore, the present invention relates to a homogenisation process for the preparation of said cellular component homogenate in liquid form and said cellular component homogenate in solid form, preferably as sprayed powder. Lastly, the present invention relates to a composition comprising said cellular component homogenate in solid form and, optionally, one or more pharmaceutical or food grade or cosmetic additives and excipients, for use in the pharmaceutical, nutraceutical, medical devices, foods for special medical purposes, dietary supplements and food industry both in the human and veterinarian field, as well as for use in the cosmetics industry.

8 Claims, 4 Drawing Sheets

HOMOGENISATION PROCESS FOR THE PREPARATION OF A CELLULAR COMPONENT HOMOGENATE

CROSS-REFERENCE TO RELATED APPLICATIONS

This application is a § 371 national phase of International Application No. PCT/IB2020/057205, filed on Jul. 30, 2020, which claims the benefit of Italian Application No. 102019000013356, filed on Jul. 30, 2019, all of which applications are incorporated by reference herein.

The present invention relates to a cellular component homogenate in liquid form, as well as to a cellular component homogenate in solid form, preferably as a freeze-dried or sprayed powder. Furthermore, the present invention relates to a homogenisation process for the preparation of said cellular component homogenate in liquid form and said cellular component homogenate in solid form, preferably as freeze-dried or sprayed powder. Lastly, the present invention relates to a composition comprising said cellular component homogenate in solid form and, optionally, one or more pharmaceutical or food grade or cosmetic additives and excipients, for use in the pharmaceutical, nutraceutical, medical devices, foods for special medical purposes, dietary supplements and food industry both in the human and veterinarian field, as well as for use in the cosmetics industry.

The techniques and methods of extraction of the various bacterial components present in bacteria, generally Gram-positive and Gram-negative on a large scale at industrial level still reveal many limits and drawbacks both in terms of the process methods used and in terms of the plant equipment used.

The limits and drawbacks still existing in the industrial production of bacterial components or bacterial extracts (more generally of lysates or bacterial homogenates) cause the product obtained, by means of partial or total breaking down of the cell wall following a whole cell processing, not to be functional (able to carry out its probiotic functional activity), not to be stable over time, well conserved under the operating conditions and processable for subsequent transformation into finished products, for example nutraceutical or cosmetic products. In addition, the product obtained ca be reproduced or standardised from a qualitative and quantitative point of view.

The technique for preparing a bacterial lysate, obtained through the lysis of whole cells mechanically, is affected by the preparation process used because the breaking down or lysis of the cell is carried out by means of a strong mechanical action carried out using mechanical stirrers or mixers or centrifuges.

During the research and development activity thereof, the Applicant was able to verify that when the partial or total breaking down, or lysis of the cells, is carried out mechanically, this type of breaking down or lysis is not able to preserve and conserve the bacterial components contained in the cells or belonging to the cells, in an optimal way, both from the productive point of view and from the point of view of metabolic activity and functional properties in terms of stability (stability over time and/or upon temperature change).

The partial or total breaking down or lysis of the cells is carried out mechanically through the direct contact of the liquid in which the cells, for example a bacterial biomass, are present and the mechanical cutting elements (rotating blades), or turbines or mixing blades, or centrifugation mills present in a mechanical stirrer or in a mixer or in a centrifuge.

The direct contact that occurs when the cells, contained in the bacterial biomass, are subjected to mechanical processing, for example, in a mechanical stirrer or mixer provided with stirring means (mixing knives or blades) or cutting means (cutting blades), which rotate at high rotation speeds, significantly affects the final product or bacterial lysate obtained, in terms of metabolic activity, functional properties and stability.

Furthermore, during the research and development activity thereof, the Applicant was able to verify that when said cell lysis is carried out through methods other than the mechanical one (for example, by means of a pressure homogenisation), the operating conditions are decisive toward producing a lysate or homogenate of bacterial strains capable of keeping the metabolic activity and the functional properties of the bacterial strains—from which said lysate or homogenate derives—intact, live and viable, and so that said activities and functionalities of the lysate or homogenate are stable over time and/or upon temperature change.

After a long and intense research and development activity, the Applicant developed a new process for the preparation of a homogenate or bacterial lysate which advantageously overcomes the aforementioned limits and drawbacks. In particular, provided through the process of the invention is a homogenate or bacterial strain lysate (liquid or solid) in which some components of the cell walls (for example, peptidoglycan or murein) of the bacterial strains subjected to the process maintain their structure (or three-dimensional structure) and thus their functionality. Furthermore, said components of the cell wall comprised in the lysate or homogenate (liquid or solid) obtained by the process of the invention are not bound to other cellular components and, therefore, they are capable of carrying out their metabolic and functional activity. Lastly, the structure and the amount of said components of the cell walls (e.g. peptidoglycan) included in the homogenate (liquid or solid) obtained by means of the process of the invention are stable over time (for example, from 1 to 6 months or 12 months) and upon temperature change (for example from 5° C. to 40° C.). In the light of the above, the process of the present invention provides a functional product comprising cell wall components of bacterial strains (e. g. peptidoglycan or murein) wherein said cell wall components are active, effective and stable over time.

Forming an object of the present invention is a process for the preparation of a cellular component homogenate in liquid form having the characteristics as defined in the attached claims.

Forming an object of the present invention is a process for the preparation of a cellular component homogenate in solid form, preferably as a freeze-dried or sprayed powder, having the characteristics as defined in the attached claims.

Forming an object of the present invention is a cellular component homogenate in liquid form having the characteristics as defined in the attached claims.

Forming an object of the present invention is a cellular component homogenate in solid form, preferably as a freeze-dried or sprayed powder, having the characteristics as defined in the attached claims.

Forming an object of the present invention is a composition comprising said cellular component homogenate in solid form (preferably as a freeze-dried or sprayed powder)

and, optionally, one or more pharmaceutical or food grade additives and excipients, for use according to the attached claims.

Preferred embodiments of the present invention will be described in greater detail hereinafter without wishing to limit the scope of the present invention in any manner whatsoever.

The terms "sprayed" or "spraying" can be used as nouns or adjectives related to a spraying step.

The term "room temperature" indicates a temperature comprised from 15° C. to 35° C., preferably from 20° C. to 30° C., even more preferably at about 25° C.

DETAILED DESCRIPTION OF THE INVENTION

The Applicant found it useful to develop a new process (FIG. 1) for the preparation of a cellular component homogenate in liquid form (or cell homogenate in liquid form (OMO1) that is stable and reproducible (homogenisation process (POMO1), subject of the present invention. Said cells subjected to the homogenisation process are cells of live and viable bacterial strains with metabolic activities and functional properties beneficial to the subjects to whom they are administered (probiotic bacterial strains).

Said cell homogenate in liquid form (OMO1), obtained from said homogenisation process (POMO1), is then subjected to a further processing process (POMO2) which provides for a step in which the freeze-drying or spraying of said OMO1 is carried out, optionally preceded by a cryoprotection step, to obtain a homogenate (OMO2) in a freeze-dried or sprayed solid form (powder), preferably sprayed.

Said freeze-dried or sprayed homogenate (OMO2) in solid form (powder) obtained from said processing process (POMO2), is then used in mixture with at least one or more pharmaceutical or food grade or cosmetic additives and excipients, to obtain a product for use in the pharmaceutical, nutraceutical, medical devices (EU Reg. 2017/745), foods for special medical purposes (FSMPs), dietary supplements and food industry both in the human and veterinarian field, as well as for use in the cosmetics industry.

According to a first embodiment (in short FR-I), the process for the preparation of a cellular component homogenate in liquid form (homogenisation process (POMO1) subject of the present invention) schematically provides for:
  a step in which at least one probiotic bacterial strain is activated or revived;
  a step in which said strain is grown to obtain a laboratory stock culture containing said strain;
  a step in which said laboratory stock culture is fermented in a fermentation broth to obtain a fermented biomass having a concentration comprised from $1\times10^6$ to $1\times10^1$% FU (active fluorescent unit), preferably from $1\times10^7$ to $1\times10^9$ AFU or preferably from $10\times10^9$ AFU to $50\times10^9$ AFU;
  a step in which a said fermented biomass is concentrated by a factor from 5 to 20 times, to obtain a concentrated biomass;
  a step in which the concentrated biomass is washed to obtain a concentrated and washed biomass;
  a homogenization step carried out in a pressure homogeniser, to obtain a cellular component homogenate in liquid form, wherein said homogenisation is carried out at a pressure from 1200 bar to 2000 bar (for example, 1250 bar, 1300 bar, 1350 bar, 1400 bar, 1450 bar, 1600 bar, 1700 bar, 1800 bar or 1900 bar), preferably from 1500 bar to 2000 bar.

The industrial fermentation step is preceded by a step in which the bacterial cell strain to be subjected to homogenisation is first activated/revived after thawing the respective cryovial. The cryovials of the WCB (working cell bank) of said strain are collected from the freezer and inoculated in anaerobiosis in a test tube, for example measuring about 15 ml, in the medium provided for by the protocol (variable from strain to strain) at an appropriate temperature (range 32° C.-37° C.). Growth steps are carried out in test tube, sterile disposable Petri dish and in a conical flask to obtain the laboratory stock culture to be fermented.

The stock culture is then subjected to a fermentation step. The industrial fermentation phase is carried out by using methods, fermentation media and equipment known to the man skilled in the art of fermentations of lactic bacteria and bifidobacteria or other genus of anaerobic bacteria.

Obtained at the end of the industrial fermentation step is a bacterial biomass in liquid form which, once produced, is preferably concentrated by means of techniques and equipment known to the man skilled in the art (for example, continuous discharge or discontinuous loading centrifuges, filtration systems) by a factor of 5-20, preferably 10, with respect to the concentration of the cells used in the fermentation step, to obtain a concentrated bacterial biomass. If, for example, at the end of the step in which the fermentation takes place there is a fermented biomass having a concentration of bifidobacteria or lactic bacteria or other genus of anaerobic bacteria (in live and viable form) from $1\times10^9$ AFU to $50\times10^9$ AFU, preferably of about $10\times10^9$ AFU, at the end of the step in which the biomass is concentrated, there will be a biomass concentration from $10\times10^9$ AFU to $500\times10^9$ AFU, preferably from $50\text{-}200\times10^9$ AFU, more preferably $100\times10^9$ AFU. The concentration step is carried out with continuous discharge centrifuges at room temperature.

The concentrated bacterial biomass of bifidobacteria or lactic bacteria or other genus of anaerobic bacteria (in live and viable form) is then preferably washed to obtain a washed and concentrated bacterial biomass of the bacterial strain in question. The washing step is carried out with sterile water cooled at a temperature comprised from 5° C. to 45° C., preferably from 10° C. to 25° C., to obtain a concentrated and washed biomass of said bacterial cell strain.

The washed and concentrated bacterial biomass is in liquid form and it contains live and viable cells, it is a biomass that is stable and reproducible from an industrial point of view and in terms of functional properties and activities.

The washed and concentrated bacterial biomass has a bacterial concentration, for example in the order of 100 billion ($100\text{-}200\times10^9$) and it contains—therein—for example water, fermentation residues, elements of the medium of choice for the growing bacterial strain, the release factors of the bacterial strain itself (postbiotic factors).

The washed and concentrated bacterial biomass exiting from the fermentation step having a temperature comprised from 10° C. to 35° C., preferably from 20° C. to 25° C., is supplied, for example by means of a pipe and a volumetric pump, flowing into a collection tank and subsequently transferred to the industrial homogenises.

According to a second embodiment (in short FR-II), the process for the preparation of a cellular component homogenate in liquid form (homogenisation process (POMO1) subject of the present invention) schematically provides for:
- a step of preparing at least one batch of a cell strain of probiotic freeze-dried bacteria, such as bifidobacteria or lactic bacteria or other genus of anaerobic bacteria;
- a step of re-hydrating—in a suitable hydrating fluid—said batch of a bacteria cell strain freeze-dried at room temperature to form a biomass of the bacteria cell strain (or suspension of the strain in said hydrating fluid) having a bacterial cell concentration comprised from $10\times10^9$ to $500\times10^9$ AFU, preferably from $100\times10^9$ to $300\times10^9$ AFU, more preferably $200\text{-}250\times10^9$ AFU, measured by means of cytofluorimetry;
- a step of homogenising said suspension of a bacterial strain carried out in a pressure homogeniser, to obtain a cellular component homogenate in liquid form, wherein said homogenisation step is carried out at a pressure from 1000 bar to 2000 bar (for example, 1200 bar, 1250 bar, 1300 bar, 1350 bar, 1400 bar, 1450 bar, 1600 bar, 1700 bar, 1800 bar or 1900 bar), preferably from 1500 bar to 2000 bar.

For example, according to the second embodiment (FR-II), one of the freeze-dried bacterial strains of the Probiotical collection is resuspended in drinking water or physiological solution at room temperature in an industrial dissolver to obtain a concentrated biomass from $100\times10^9$ to $300\times10^9$, preferably $200\times10^9$. In said first embodiment (FR-I) and in said second embodiment (FR-II) the homogenisation step takes place under similar conditions to obtain a cellular component homogenate in similar liquid form.

The industrial homogeniser (FIG. 1, according to FR-I or FR-II), used both in said first embodiment (FR-I) and in said second embodiment (FR-II) is of the pressure type to carry out a homogenisation step by means of pressure only. The homogenisation step is solely and exclusively carried out using a pressure exerted on a portion of the biomass volume in a continuous dynamic process. The homogenisation step does not in any way provide for the use of the mechanical cutting elements or turbines or mixing blades, or centrifugation mills present in a mixer or in a centrifuge at direct contact with the biomass.

In the homogenisation step, the cell wall is broken down solely and exclusively using the operating pressure, which is exerted on a portion of the biomass volume (for example a volume from 10 litres to 100 litres) and not by means of a mechanical breaking down using metal cutting parts, or turbines, or mixing blades, or centrifugation mills.

The pressure homogenisation step applied to the concentrated and washed biomass according to FR-I or to the biomass according to FR-II is able to determine the breaking down of the bacterial wall and micronize the particles of the treated product (cells present in the biomass) in order to improve the mixing and stability thereof. In other words, the homogenisation step carried out with a pressure homogeniser allows to make the cellular components—such as for example the cell wall or the components of the cell wall—present in the biomass cells homogeneous. An emulsion biomass (homogenate in liquid form) is obtained with a high degree of suspension and dispersion in which the micronized particles (the cellular components, for example peptidoglycan) are stable (with time and/or upon temperature change) and uniform. Preferably, said biomass has a density comprised from 1.02 to 1.10 weight/volume.

Figure 2:
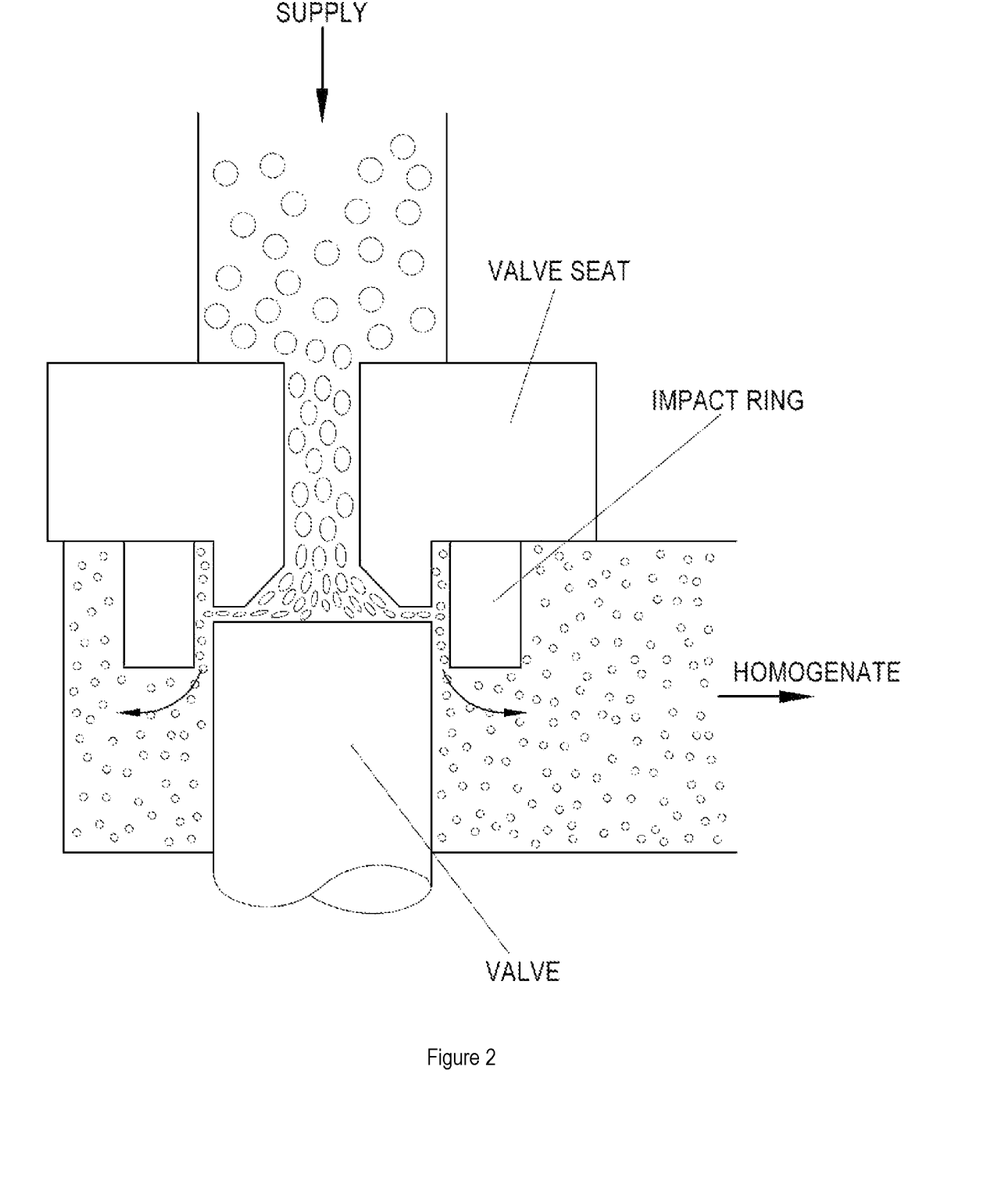
FIG. 2 refers to a diagram of a homogeniser valve (or valve of a homogeniser capable of homogenising).

One type of industrial pressure homogeniser that can, for example, be used in the context of the present invention is of the 3 plunger type, with rear cooling chamber, positioned on the rear part of the compression head. Housed in the compression head are the plungers, whose task is to pump the biomass under pressure (for example, product input pressure: 3-4 bar), the intake and delivery valves, and the homogeniser valve (FIG. 2), where the biomass is homogenised (at an operating pressure comprised from 1200 bar to 2000 bar, preferably from 1500 bar to 2000 bar). FIG. 2 shows a diagram of a homogeniser valve in which the product being processed (biomass), pushed by a discontinuous pump, is forced to sudden changes in energy, from potential (high pressure (or primary pressure), low speed) to kinetics (low pressure (secondary pressure), high speed).

Said primary pressure is comprised in a range from 1200 bar to 2000 bar, preferably from 1500 or 1600 bar to 2000 bar. Said primary pressure is also defined as the "operating pressure" being the higher pressure exerted during the homogenisation step.

Said secondary pressure is comprised in a range from 50 bar to 200 bar, preferably from 100 bar to 150 bar.

One type of homogeniser may have, for example, a supply pressure of about 3-4 bar, a supply flow rate of about 1500-2500 L/hour and an operating pressure up to about 2000 bar.

For example, a type of homogeniser that can be used in the context of the present invention may have the following specifications:
1. flow rate range 1000-2000 litres/hour;
2. primary pressure range: 1600-2000 bar;
3. secondary pressure range: 100-150 bar;
4. condensate temperature range: 45° C.-65° C.;
5. Water pressure range: 2.5-3.5 bar (for vapour condensation);
6. product input pressure range: 3-4 bar.

The two pressures, the primary and the secondary, are exerted in line and both are fundamental for the optimal homogenisation of the product: as a matter of fact, pressure shocks obtained at different pressures with respect to each other are needed to improve the homogenisation. The homogenisation step with the relative pressures is set at the beginning of the first cycle and it remains stable and unchanged throughout the homogenisation process during the processing steps, which can vary from strain to strain.

The homogenisation step comprises a number of processing cycles or steps comprised from 1 to 10 for the total volume of the biomass, preferably from 4 to 8, even more preferably from 3 to 6. The homogenisation step is carried out over a period of time which depends on the number of cycles or steps carried out on the biomass and on the type of homogeniser (flow rate in litres/hour and operating pressure in $Kg/cm^2$ or bar) used. For example, when processing of 1000 litres of biomass in a pressure homogeniser having a flow rate of 2000 litres/hour and an operating pressure of 2000 bar, a processing cycle or step will last about 0.5 hours.

If the homogenisation step provides for 6 cycles, the homogenisation step of 1000 litres of biomass is carried out in 3 hours.

Figure 1:
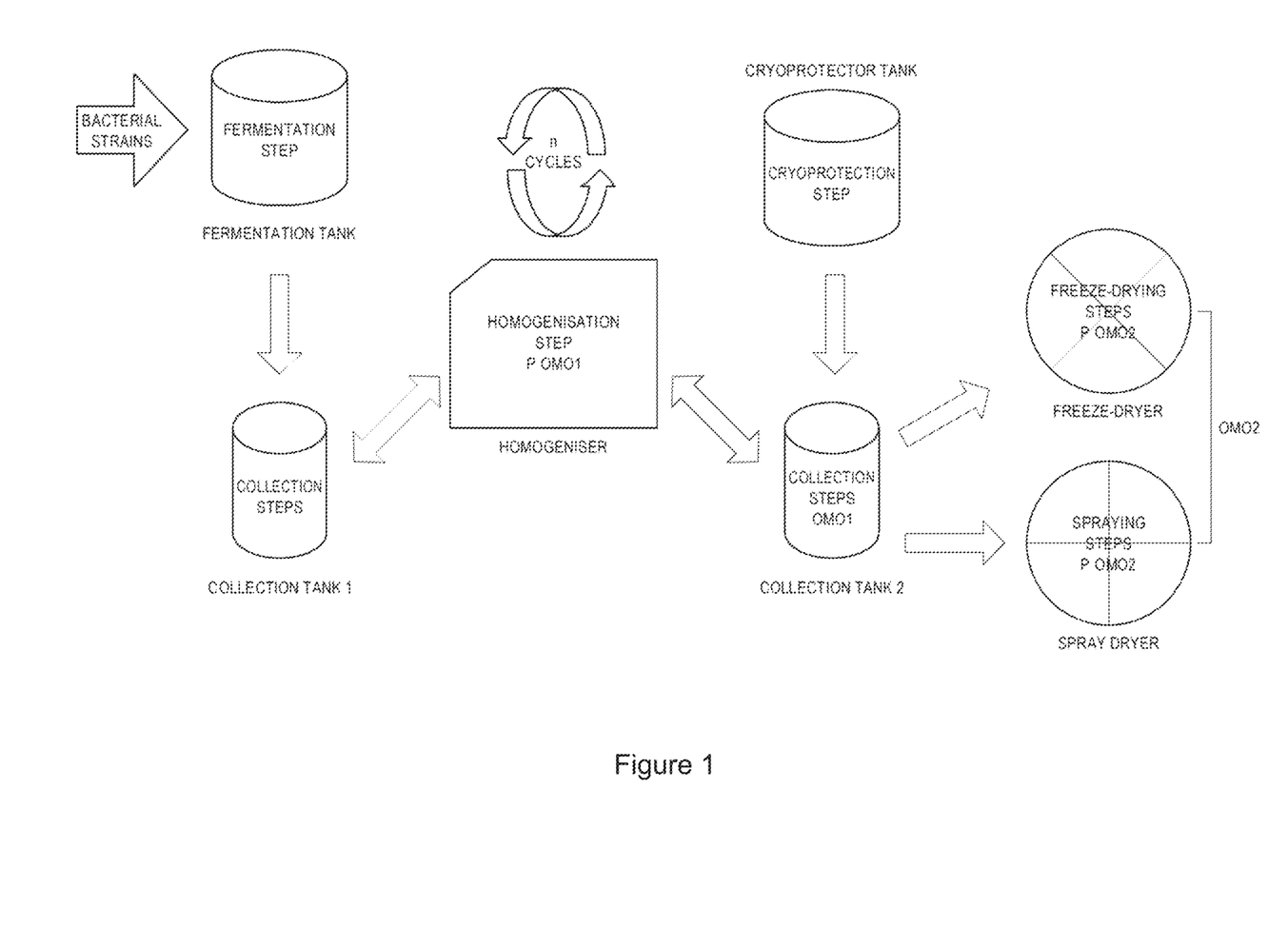
FIG. 1 refers to the process diagram of the homogenisation process (POMO1 and POMO2) subject of the present invention, according to FR-I or FR-II.

The expression processing cycle or step is used to indicate that the whole volume of the concentrated and washed bacterial biomass according to FR-I or of the biomass according to FR-II flowing into the homogeniser is subjected to a pressure homogenisation, homogenization carried out on n portions of said total volume of said biomass (for example, volume portion from 10 ml to 100 ml) in a dynamic continuous process as in FIG. 1.

Once a volume portion of said biomass has been pressure homogenised, this portion is continuously transferred and collected in a temperature-controlled container (collection tank). Once the whole volume of said biomass has been pressure homogenised, a processing cycle or step is completed. A processing cycle or step will be considered completed once the whole biomass volume will have been collected in said container at a controlled temperature. The temperature of the homogenised biomass exiting from the homogeniser and entering into said container is comprised from 15° C. to 35° C., preferably from 20° C. to 30° C., even more preferably at about 25° C. The temperature of the homogenised biomass in said container (collection tank) is comprised from 5° C. to 20° C., preferably from 10° C. to 15° C.

Once the whole biomass volume has been pressure homogenised and collected in said container (collection tank) at the end of a cycle, the volume is once again supplied back into said homogeniser to carry out a further processing cycle or step under the same operating conditions as the previous cycle. Therefore, the whole volume of said biomass will be cyclically supplied to said homogeniser in a number of times equal to the number of cycles or steps established for a given bacterial strain.

At the end of each processing cycle or step a sample of homogenised biomass is taken from said container (collection tank) at a controlled temperature (temperature 5°–20° C. or 10° C.-15° C.) and subjected to a cytofluorimetric reading (cytofluorimetry) by means of a cytofluorimeter to determine the membrane integrity reading value (as the value of cells not lysed by the pressure homogenisation), a value preferably comprised from 0.05% or 1% to 10% (for example, 0.01%, 0.5%, 1.5%, 2%, 2.5%, 3%, 4%, 5%, 6%, or 8%) of the initial membrane integrity value of the concentrated and washed biomass according to FR-I or of the biomass according to FR-II. Such membrane integrity value is the optimal range that allows to obtain a plate growth comprised from 1% to 0.01%, preferably of about 0.1%. For example, if the concentration of bacteria with an intact membrane of the concentrated and washed biomass at the inlet of the homogeniser is about $100 \times 10^9$ AFU, at the end of the homogenisation steps, there for example will be (1%) equal to $1 \times 10^9$ AFU, so as to have a plate count equal to $1 \times 10^6$ CFU (0.1% with respect to the cytofluorimetric reading after homogenisation).

Figure 3:
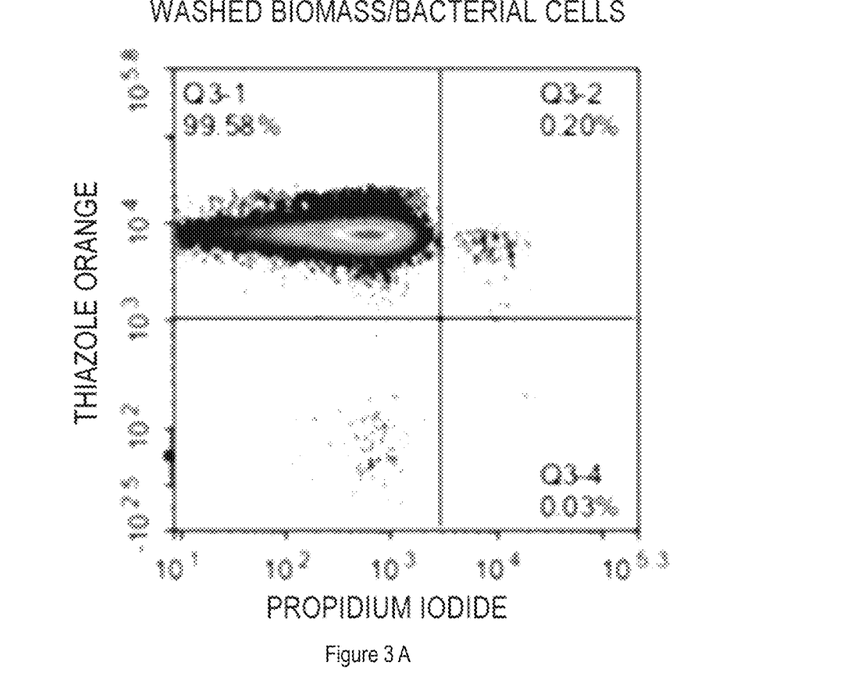
FIG. 3 refers to the dot plots of cytofluorimetric reading (with cytofluorimeter) of a bacterial strain L. fermentum LF5 DSM 32277 (deposited by Probiotical S.p.A. on Mar. 18, 2016) for the evaluation of the processing steps of the homogenisation process, subject of the present invention.

By way of example, added hereto is FIG. 3 (A and B) highlighting the differences between the reading of the concentrated and washed biomass (before the homogenisation step) and the reading at the end of the homogenisation cycle: the membrane integrity cloud disappears completely in box Q3-1 of the T6 dot plot. Dot plot 1 shows the membrane integrity of an *L. fermentum* LF5 DSM 32277 fermentate (deposited by Probiotical S.p.A. on Mar. 18, 2016) with a cell count of about $100 \times 10^9$ (box Q3-1). Dot plot 2 shows that after 6 cycles or steps (homogenisation step completed) the cells are no longer totally intact (only 2.05%) and the cellular components are moved into box Q3-3.

Table 1 refers to FIG. 3A, while table 2 refers to FIG. 3B.
In tables 1 and 2 and in FIGS. 3A and 3B, the boxes have the following meanings:
 Q3-1: membrane integrity initial value of the concentrated and washed biomass prior to the pressure homogenisation step;
 Q3-2: damaged cell value
 Q3-2: cellular component value
 Q3-2: dead cell value

TABLE 1

| Gate | Count | % Bacterial cells |
|---|---|---|
| Bacterial cells | 107.401 | 100.00% |
| Q3-1 | 106.949 | 99.58% |
| Q3-2 | 210 | 0.20% |
| Q3-3 | 211 | 0.20% |
| Q3-4 | 31 | 0.03% |

TABLE 2

| Gate | Count | % Bacterial cells |
|---|---|---|
| Bacterial cells | 877 | 100.00% |
| Q3-1 | 18 | 2.05% |
| Q3-2 | 1 | 0.11% |
| Q3-3 | 853 | 97.26% |
| Q3-4 | 5 | 0.57% |

The homogenisation step ends upon reaching said membrane integrity value comprised from 0.1% or 1% to 10%, preferably from 0.5% to 6%, more preferably from 1% to 3%, of the initial value of the concentrated and washed biomass according to FR-I or of the biomass according to FR-II.

At the end of the homogenisation step and, therefore, at the last processing cycle or step of the whole biomass volume, all the homogenised biomass will be present in said collection container at controlled temperature (temperature 5°–20° C. or 10° C.-15° C.).

The concentrated, washed and homogenised bacterial biomass (or biomass at the end of the homogenisation step) is in liquid form and it therein contains cell wall fragments, such as glycoproteins, phospholipids, murein (or peptidoglycan) and all intracellular components such as for example DNA, ribosomes and proteins.

Murein (also known as peptidoglycan or bacterial mucopeptide) is a polymer that represents an essential component of the cell wall of bacteria being the main factor responsible for the cell integrity. The bacterial classification resulting from Gram staining is based on the different composition of the wall made of murein. It is therefore well known that murein is a fundamental component of the bacterial wall and it is found both in Gram-positive and in Gram-negative, but in different proportions. It is very abundant in Gram+ (90% of the wall) and less abundant in Gram− (10% of the wall). In the context of the present invention the terms "murein" and "peptidoglycan" are used as synonyms of the same substance.

The concentrated, washed and homogenised bacterial biomass (or biomass at the end of the homogenisation step) of bifidobacteria or lactic bacteria or other genus of anaerobic bacteria represents the cellular component homogenate in stable and reproducible liquid form (OMO1), subject of the present invention.

Said cellular component homogenate in stable and reproducible liquid form (OMO1), obtained from said homogenisation process (POMO1) (according to said FR-I or FR-II), is then subjected to a further processing process (POMO2), which provides for a step in which freeze-drying or spraying (preferably a spraying step) is carried out, possibly (optionally) preceded by a step in which a cryoprotection (cryoprotection step) is carried out to obtain a freeze-dried or sprayed homogenate in solid form (OMO2)—FIG. 1. Thus, said homogenate in a freeze-dried or sprayed solid form can derive from a process according to the invention (POMO1 and POMO2) comprising or not comprising a cryoprotective step.

Basically, according to an aspect of the invention, the concentrated, washed and homogenised bacterial biomass or biomass at the end of the homogenisation step (in short, the homogenised biomass) is subjected to a cryoprotection step using standard cryoprotectants in use, such as for example polysaccharides, such as for example sugars, preferably sucrose alone or in admixture, for example, with sodium, potassium, calcium or magnesium salts of phosphoric acid.

Said cryoprotection step provides for that the cryoprotectant in liquid form, prepared and previously cooled (temperature from 5° C. to 15° C., preferably about 10° C.), be added, at a concentration comprised from 5% to 40% by weight with respect to the weight of the homogenised biomass in liquid form, preferably equal to about 20%, for transfer under overpressure (pressure from 0.5 bar to 1.5 bar) from the cryoprotectant container to the homogenised biomass in liquid form in the container at a temperature comprised from 5° to 20° C., preferably about 10° C., to obtain a homogenised and cryoprotected biomass.

At the end of the cryopreservation step, the homogenised and cryoprotected biomass, still in liquid form, is subjected to a subsequent freeze-drying or spraying step, preferably spraying step, to obtain a biomass in solid form having a concentration for example 10-15 times (for example 3, 5, 8, or 12 times) more concentrated than the biomass (according to FR-I or according to FR-II) entering the homogenises.

If, for example, at the end of the step in which the biomass concentration is achieved (according to FR-I) there is a concentrated biomass having a concentration of bifidobacteria or lactic bacteria or other genus of anaerobic bacteria (in live and viable form) of about $100 \times 10^9$ AFU, at the end of the freeze-drying or spraying step, there will be a component homogenate in solid form OMO2 (powder) which therein contains cell wall fragments, such as for example glycoproteins, phospholipids and peptidoglycan (murein) and all intracellular components, such as for example DNA, ribosomes and proteins.

In this case (both in the presence and in the absence of the cryoprotection step) an amount of murein (or peptidoglycan) comprised from 5% to 40% by weight, preferably from 10% to 30% by weight, even more preferably from 15% to 25% by weight with respect to the weight of the freeze-dried or sprayed sample (homogenate in solid form of the present invention) can be obtained.

Said homogenate in solid form of the present invention (obtained from the process of the present invention according to FR-I or FR-II and from said step of pressure homogenisation step and subsequent freeze-drying or spraying step) comprises murein (or peptidoglycan) at an initial amount (for example, at a percentage by weight comprised from 5% to 40%, preferably from 10% to 30%, more preferably from 15% to 25%, with respect to the weight of the homogenate in solid form) predominantly constant over time (for example from 1 month to 5 years or from 6 months to 3 years or 12 months to 24 months) and/or upon temperature change (for example, from 0° C. to 50° C., preferably from 5° C. to 40° C., more preferably from 15° C. to 35° C.). Furthermore, said murein (or peptidoglycan) comprised in said homogenate in liquid form and/or in solid form maintains its structure stable (over time and/or upon temperature change), it is mainly not bound to other cellular components and, therefore, it is able to exert a metabolic and functional activity. For example, it can be assumed that, following homogenisation, there be formed cell wall parts to which the peptidoglycan chains remain complexed and act as activators.

The term "constant" or "prevalently constant," referring to the amount of peptidoglycan comprised in said homogenate, means that the amount (for example, amount by weight) of peptidoglycan present in the homogenate at the end of the pressure homogenisation step (in short, initial amount of peptidoglycan) remains approximately constant in a time range with a possible change of said amount at a percentage comprised from 0.5% to 10% (for example, 1%, 2%, 3%, 4%, 5%, 6% or 8%) with respect to 100% of the amount.

Freeze-drying and spraying are carried out using methods and equipment known to the man skilled in the art.

For example, spraying can be carried out with an spray dryer normally used for the spraying and drying liquid suspensions with a protocol which provides for an input temperature of the drying air of about 150° C.-180° C. and an output temperature of about 70° C.-90° C.

In an embodiment, the cellular component homogenate in solid form OMO2 (freeze-dried or sprayed powder) is used in a manner such to be mixed with one or more pharmaceutical or food grade or cosmetic additives to obtain a composition which can be advantageously used in the production of finished products in the pharmaceutical, nutraceutical, medical devices, food for special medical purposes, supplements and food industry for both human and veterinary purposes, as well as for use in the cosmetic industry.

Aspects of the present invention according to the first embodiment FR-I are reported below (FR-I-no): FR-I-1. A process for preparing a cellular component homogenate in liquid form comprising the following steps:

reviving at least one bacterial cell strain selected from among the group comprising bifidobacteria, lactic bacteria or other genus of anaerobic bacteria, after thawing the respective cryovial to obtain a strain culture of viable bacterial cells;

carrying out growth phases—in a test tube, in a sterile disposable Petri dish and in a conical flask—of said strain culture of viable bacterial cells to obtain a laboratory stock culture containing said strain of viable bacterial cells;

fermenting said laboratory stock culture, after suitable sterile inoculation in the selective culture medium of said strain of viable bacterial cells, to obtain a fermented biomass containing said strain of viable bacterial cells at a concentration comprised from $1 \times 10^6$ to $1 \times 10^{10}$ AFU, measured using a cytofluorometry method;

concentrating, by a factor comprised from 5 to 20 times, said fermented biomass containing said strain of viable bacterial cells, preferably for continuous centrifugation, to obtain a concentrated biomass of said bacterial cell strain;

washing said concentrated biomass of said strain of viable bacterial cells with sterile water at a temperature comprised from 5° C. to 45° C., preferably from 10° C. to 25° C., to obtain a concentrated and washed biomass of said strain of viable bacterial cells;

subjecting said concentrated and washed biomass of said bacteria cell strain to a homogenisation step in a pressure homogeniser to obtain a homogenate in liquid form containing the cellular components of said strain.

FR-I-2. The process according to FR-I-1, wherein said step for fermenting said laboratory stock culture to obtain a fermented biomass is carried out up to reaching a bacterial cell concentration comprised from $1 \times 10^7$ to $1 \times 10^9$ AFU, preferably $1 \times 10^8$ AFU, measured using a cytofluorometry method, in the fermented biomass.

FR-I-3. The process according to FR-I-1, wherein said step for concentrating said fermented biomass containing said bacterial cell strain is obtained by a factor equal to 10 times, with respect to the bacterial cell concentration comprised from $1 \times 10^6$ to $1 \times 10^{10}$ AFU, preferably from $1 \times 10^7$ and $1 \times 10^9$ AFU, even more preferably $1 \times 10^9$ AFU, measured using a cytofluorometry method, present in the fermented biomass.

FR-I-4. The process according to FR-I-1, wherein said step of subjecting said concentrated biomass to a homogenisation step is carried out in a pressure homogeniser having, preferably a supply flow rate comprised from 1000 to 2000 litres/hour and an operating pressure, during the homogenisation of said biomass, comprised from 1000 bars to 2000 bars, for each working cycle or step.

FR-I-5. The process according to FR-I-4, wherein said homogenisation step is carried out after completing a number of processing cycles or steps comprised from 1 to 10, preferably from 4 to 8, even more preferably from 3 to 6.

FR-I-6. A cellular component homogenate in liquid form obtained according to the process according to any one of FR-I-1-5.

FR-I-7. A process for preparing a cellular component homogenate in solid form, wherein said process comprises a further step for subjecting said cellular component homogenate in liquid form obtained according to the process according to any one of FR1-FR5 to a cryoprotection step wherein a cryoprotectant solution in liquid form containing at least one sugar, preferably sucrose, and at least one sodium, potassium, calcium or magnesium salt of phosphoric acid, is added to said homogenate to obtain a cryoprotected homogenate.

FR-I-8. The process for preparing a cellular component homogenate in solid form, preferably a freeze-dried or sprayed powder, according to FR-I-7, wherein said cryoprotected homogenate in liquid form is subjected to a further freeze-drying or spraying step to obtain a cellular component homogenate in solid form.

FR-I-9. A cellular component homogenate in solid form, preferably freeze-dried or sprayed powder obtained according to the process according to FR-I-7 or FR-I-8, wherein said homogenate contains murein at an amount comprised from 5% to 40% by weight, preferably from 10% to 30% by weight, even more preferably from 15% to 25% by weight, with respect to the weight of the homogenate.

FR-I-10. A composition comprising said cellular component homogenate in solid form according to FR-I-9 and, optionally, one or more pharmaceutical or food grade or cosmetic additives and excipients, for use in the pharmaceutical, nutraceutical, medical devices, foods for special medical purposes, dietary supplements and food industry both in the human and veterinarian field, as well as for use in the cosmetics industry.

Experimental Part

Study of stability over time at different temperatures of homogenates in solid form of cellular components of strains of bacteria obtained according to the process of the present invention (hereinafter, solid homogenates).

In the present experimental study, stability over a one-year time range at different temperatures was evaluated (stability at: 40° C. at 0, 1, 2, 3, 6 and 12 months; at 25° C. at 0, 3, 6 and 12 months and at 5° C. at 0, 3, 6 and 12 months) of said solid homogenates (obtained according to FR-I or FR-II).

In particular, the stability study was carried out on samples obtained from homogenised bacterial strains in liquid phase according to FR-II and then sprayed (not freeze-dried), without addition of phosphates and without cryoprotection.

Solid homogenates obtained from strains of bacteria belonging to different genera and species were analysed according to Table A. The stability results do not vary considerably with the variation of the genus and species to which the strains belong. The stability data of two samples of representative bacteria strains (in short, test samples or Sample 1 and Sample 2) expressed as the amount (weight/weight percentage) of murein (peptidoglycan) present in each test sample are reported below.

An enzymatic mixture and the addition of chemical additives for the digestion of the cellular components, except for the peptidoglycan of interest (i.e. murein), were used for the isolation and quantification of the murein in the samples under analysis. The quantification (in triplicate) took place following gravimetric separation of murein from the undesired cellular components.

I. Time Zero (t0)

Table 3 shows the results of gravimetric quantitation of the murein of the 2 samples analysed (mean value of 3 replicates), starting from 500 mg of sample at time zero (t0 immediately after completing the pressure homogenisation step)

TABLE 3

| | Initial weight (mg) | purified murein by dry weight (mg) | | percentage of isolated murein (% weight/weight) | |
|---|---|---|---|---|---|
| | | Mean | St. dev | Mean | St. dev |
| Sample 1 | 500 | 76.4 | 9.9 | 15.3 | 2.0 |
| Sample 2 | 500 | 85.5 | 6.8 | 17.1 | 1.4 |

II. Time 1 Month (t1)

Table 4 shows the results of gravimetric quantitation of the murein of the 2 samples analysed (mean value of 3 replicates), starting from 500 mg of sample after 1 month (t1) at about 40° C.

TABLE 4

| | Initial weight (mg) | purified murein by dry weight (mg) | | percentage of isolated murein (% weight/weight) | |
|---|---|---|---|---|---|
| | | Mean | Standard dev. | Mean | Standard dev. |
| Sample 1 | 500 | 75.9 | 5.0 | 15.2 | 1.0 |
| Sample 2 | 500 | 87.3 | 8.7 | 17.5 | 1.7 |

III. Time 2 Months (t2)

Table 5 shows the results of gravimetric quantitation of the murein of the 2 samples analysed (mean value of 3 replicates), starting from 500 mg of sample after 2 months (t2) at about 40° C.

TABLE 5

| | purified murein by dry weight (mg) | | percentage of isolated murein (% weight/weight) | |
|---|---|---|---|---|
| Initial weight (mg) | Mean | Standard dev. | Mean | Standard dev. |
| Sample 1  500 | 75.9 | 3.4 | 15.2 | 0.7 |
| Sample 2  500 | 87.3 | 4.0 | 17.5 | 0.8 |

IV. Time 3 Months (t3)

Figure 4A:
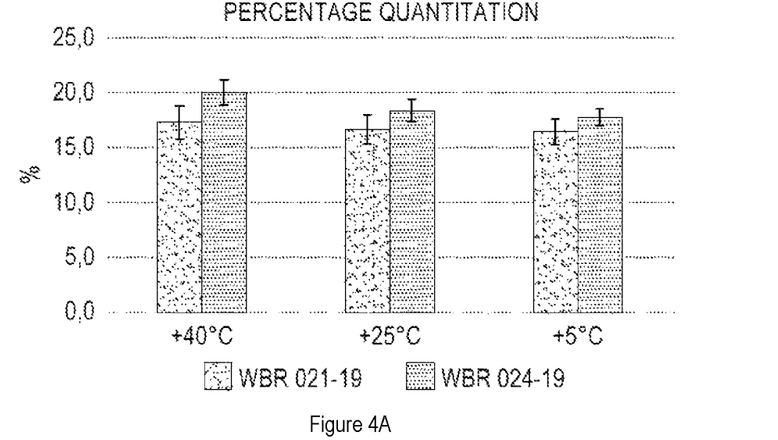
FIGS. 4A, 4B and 4C refer to gravimetric quantitation (% w/w) of the peptidoglycan in samples of cellular component homogenate of bacterial strains after 3, 6 and 12 months at 40° C., 25° C. or 5° C.

Table 6 (and FIG. 4A) shows the results of gravimetric quantitation of the murein of the 6 samples analysed (mean value of 3 replicates), starting from 500 mg of sample after 3 months (t3) at about 40° C. or 25° C. or 5° C.

TABLE 6

| | Initial weight (mg) | purified murein by dry weight (mg) | | percentage of isolated murein (% weight/weight) | |
|---|---|---|---|---|---|
| | | Mean | Standard dev. | Mean | Standard dev. |
| Sample 1- 40° C. | 500 | 86.8 | 7.8 | 17.4 | 1.6 |
| Sample 2- 40° C. | 500 | 99.9 | 5.8 | 20.0 | 1.2 |
| Sample 1- 25° C. | 500 | 83.4 | 6.3 | 16.7 | 1.3 |
| Sample 2- 25° C. | 500 | 91.9 | 5.0 | 18.4 | 1.0 |
| Sample 1- 5° C. | 500 | 82.3 | 5.9 | 16.5 | 1.2 |
| Sample 2- 5° C. | 500 | 89.2 | 3.7 | 17.8 | 0.7 |

V. Time 6 Months (t6)

Figure 4B:
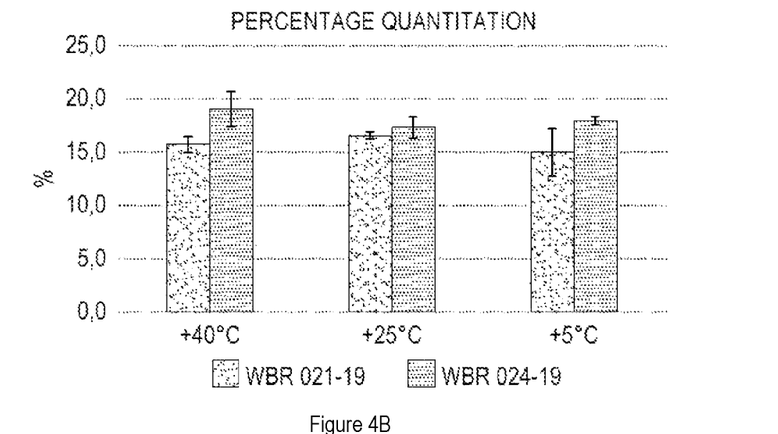

Table 6 (and FIG. 4B) shows the results of gravimetric quantitation of the murein of the 6 samples analysed (mean value of 3 replicates), starting from 500 mg of sample after 6 months (t6) at about 40° C. or 25° C. or 5° C.

TABLE 7

| | Initial weight (mg) | purified murein by dry weight (mg) | | percentage of isolated murein (% weight/weight) | |
|---|---|---|---|---|---|
| | | Mean | Standard dev. | Mean | Standard dev. |
| Sample 1- 40° C. | 500 | 78.9 | 3.4 | 15.8 | 0.7 |
| Sample 2- 40° C. | 500 | 95.4 | 8.0 | 19.1 | 1.6 |
| Sample 1- 25° C. | 500 | 82.9 | 1.7 | 16.6 | 0.3 |
| Sample 2- 25° C. | 500 | 87.0 | 5.0 | 17.4 | 1.0 |
| Sample 1- 5° C. | 500 | 74.9 | 11.0 | 15.0 | 2.2 |
| Sample 2- 5° C. | 500 | 89.7 | 1.8 | 17.9 | 0.4 |

VI. Time 12 Months (t12)

Figure 4C:
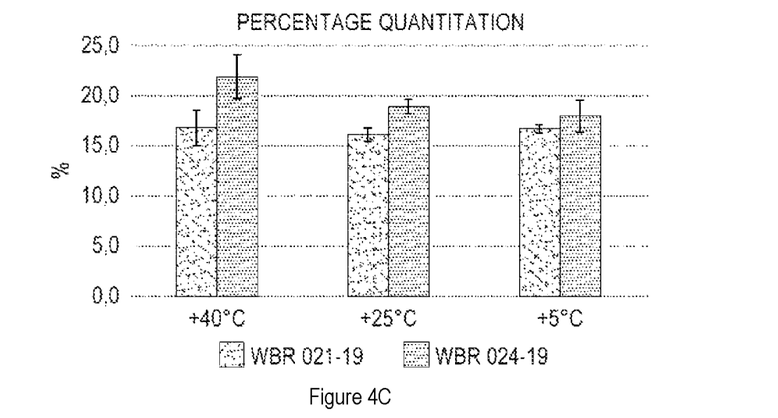

Table 8 (and FIG. 4C) shows the results of gravimetric quantitation of the murein of the 6 samples analysed (mean value of 3 replicates), starting from 500 mg of sample after 12 months (t12) at about 40° C. or 25° C. or 5° C.

TABLE 8

| | Initial weight (mg) | purified murein by dry weight (mg) | | percentage of isolated murein (% weight/weight) | |
|---|---|---|---|---|---|
| | | Mean | Standard dev. | Mean | Standard dev. |
| Sample 1- 40° C. | 500 | 86.8 | 7.8 | 16.8 | 1.8 |
| Sample 2- 40° C. | 500 | 99.9 | 5.8 | 21.9 | 2.2 |
| Sample 1- 25° C. | 500 | 83.4 | 6.3 | 16.2 | 0.7 |
| Sample 2- 25° C. | 500 | 91.9 | 5.0 | 19.0 | 0.7 |
| Sample 1- 5° C. | 500 | 82.3 | 5.9 | 16.7 | 0.4 |
| Sample 2- 5° C. | 500 | 89.2 | 3.7 | 18.0 | 1.6 |

CONCLUSIONS

In a time range of 12 months, the quantitation of murein isolated from the two samples of solid homogenate of cellular components of strains of bacteria obtained by the process of the present invention is al-most constant at the three tested temperatures (40° C., 25° C. and 5° C.).

TABLE A

| No. | Name | Trade name | Depository authority | Deposit number | Date of deposit | Proprietor |
|---|---|---|---|---|---|---|
| 1 | *Lactobacillus casei* | LF1i | CNCM I.P. | I-785 | Jul. 21, 1988 | Anidral Srl |
| 2 | *Lactobacillus gasseri* | LF2i | CNCM I.P. | I-786 | Jul. 21, 1988 | Anidral Srl |
| 3 | *Lactobacillus crispatus* | LF3i | CNCM I.P. | I-787 | Jul. 21, 1988 | Anidral Srl |
| 4 | *Lactobacillus fermentum* | LF4i | CNCM I.P. | I-788 | Jul. 21, 1988 | Anidral Srl |
| 5 | *Lactobacillus fermentum* | LF5 | CNCM I.P. | I-789 | Jul. 21, 1988 | Anidral Srl |
| 6 | *Lactobacillus casei* ssp. *pseudoplantarum* | LFH i | CNCM I.P. | I-790 | Jul. 21, 1988 | Anidral Srl |
| 7 | *Streptococcus thermophilus* B39 | | BCCM LMG | LMG P-18383 | May 5, 1998 | Anidral Srl |
| 8 | *Streptococcus thermophilus* T003 | | BCCM LMG | LMG P-18384 | May 5, 1998 | Anidral Srl |
| 9 | *Lactobacillus pentosus* 9/1 ei | | BCCM LMG | LMG P-21019 | Oct. 16, 2001 | Mofin Srl |
| 10 | *Lactobacillus plantarum* 776/1 bi | LP 02 | BCCM LMG | LMG P-21020 | Oct. 16, 2001 | Mofin Srl |
| 11 | *Lactobacillus plantarum* 476LL 20 bi | LP 01 | BCCM LMG | LMG P-21021 | Oct. 16, 2001 | Mofin Srl |
| 12 | *Lactobacillus plantarum* PR ci | | BCCM LMG | LMG P-21022 | Oct. 16, 2001 | Mofin Srl |
| 13 | *Lactobacillus plantarum* 776/2 hi | | BCCM LMG | LMG P-21023 | Oct. 16, 2001 | Mofin Srl |
| 14 | *Lactobacillus casei* ssp. *paracasei* 181A/3 aiai | LPC00 | BCCM LMG | LMG P-21380 | Jan. 31, 2002 | Anidral Srl |
| 15 | *Lactobacillus* belonging to the *acidophilus* group 192A/1 aiai | LA 02 | BCCM LMG | LMG P-21381 | Jan. 31, 2002 | Anidral Srl |

TABLE A-continued

| No. | Name | Trade name | Depository authority | Deposit number | Date of deposit | Proprietor |
|---|---|---|---|---|---|---|
| 16 | *Bifidobacterium longum* 175A/1 aiai | | BCCM LMG | LMG P-21382 | Jan. 31, 2002 | Anidral Srl |
| 17 | *Bifidobacterium breve* 195A/1 aici | | BCCM LMG | LMG P-21383 | Jan. 31, 2002 | Anidral Srl |
| 18 | *Bifidobacterium lactis* 32A/3 aiai | BS 01 | BCCM LMG | LMG P-21384 | Jan. 31, 2002 | Anidral Srl |
| 19 | *Lactobacillus plantarum* 501/2 gi | COAKTIV | BCCM LMG | LMG P-21385 | Jan. 31, 2002 | Mofin Srl |
| 20 | *Lactococcus lactis* ssp. *lactis* 501/4 ci | | BCCM LMG | LMG P-21388 | Jan. 31, 2002 | Mofin Srl |
| 21 | *Lactococcus lactis* ssp. *lactis* 501/4 hi | | BCCM LMG | LMG P-21387 | Mar. 15, 2002 | Mofin Srl |
| 22 | *Lactococcus lactis* ssp. *lactis* 501/4 ci | | BCCM LMG | LMG P-21388 | Jan. 31, 2002 | Mofin Srl |
| 23 | *Lactobacillus plantarum* 501/4 li | | BCCM LMG | LMG P-21389 | Mar. 15, 2002 | Mofin Srl |
| 24 | *Lactobacillus acidophilus* | LA08 | BCCM LMG | LMG P-26144 | Nov. 3, 2010 | Probiotical SpA |
| 25 | *Lactobacillus paracasei* ssp. *paracasei* | LPC10 | BCCM LMG | LMG P-26143 | Nov. 3, 2010 | Probiotical SpA |
| 26 | *Streptococcus thermophilus* | GB1 | DSMZ | DSM 16506 | Jun. 18, 2004 | Anidral Srl |
| 27 | *Streptococcus thermophilus* | GB5 | DSMZ | DSM 16507 | Jun. 18, 2004 | Anidral Srl |
| 28 | *Streptococcus thermophilus* | Y02 | DSMZ | DSM 16590 | Jul. 20, 2004 | Anidral Srl |
| 29 | *Streptococcus thermophilus* | Y03 | DSMZ | DSM 16591 | Jul. 20, 2004 | Anidral Srl |
| 30 | *Streptococcus thermophilus* | Y04 | DSMZ | DSM 16592 | Jul. 20, 2004 | Anidral Srl |
| 31 | *Streptococcus thermophilus* | YO5 | DSMZ | DSM 16593 | Jul. 20, 2004 | Anidral Srl |
| 32 = 56 | *Bifidobacterium adolescentis* | BA 03 | DSMZ | DSM 16594 | Jul. 21, 2004 | Anidral Srl |
| 33 | *Bifidobacterium adolescentis* | BA 04 | DSMZ | DSM 16595 | Jul. 21, 2004 | Anidral Srl |
| 34 | *Bifidobacterium breve* | BR 04 | DSMZ | DSM 16596 | Jul. 21, 2004 | Anidral Srl |
| 35 | *Bifidobacterium pseudocatenulatum* | BP 01 | DSMZ | DSM 16597 | Jul. 21, 2004 | Anidral Srl |
| 36 | *Bifidobacterium pseudocatenulatum* | BP 02 | DSMZ | DSM 16598 | Jul. 21, 2004 | Anidral Srl |
| 37 | *Bifidobacterium longum* | BL 03 | DSMZ | DSM 16603 | Jul. 20, 2004 | Anidral Srl |
| 38 | *Bifidobacterium breve* | BR 03 | DSMZ | DSM 16604 | Jul. 20, 2004 | Anidral Srl |
| 39 | *Lactobacillus casei* ssp. *rhamnosus* | LR 04 | DSMZ | DSM 16605 | Jul. 20, 2004 | Anidral Srl |
| 40 | *Lactobacillus delbrueckii* ssp. *bulgaricus* | LDB 01 | DSMZ | DSM 16606 | Jul. 20, 2004 | Anidral Srl |
| 41 | *Lactobacillus delbrueckii* ssp. *bulgaricus* | LDB 02 | DSMZ | DSM 16607 | Jul. 20, 2004 | Anidral Srl |
| 42 | *Staphylococcus xylosus* | SX 01 | DSMZ | DSM 17102 | Feb. 1, 2005 | Anidral Srl |
| 43 = 57 | *Bifidobacterium adolescentis* | BA 02 | DSMZ | DSM 17103 | Feb. 1, 2005 | Anidral Srl |
| 44 | *Lactobacillus plantarum* | LP 07 | DSMZ | DSM 17104 | Feb. 1, 2005 | Anidral Srl |
| 45 | *Streptococcus thermophilus* | YO8 | DSMZ | DSM 17843 | Dec. 21, 2005 | Anidral Srl |
| 46 | *Streptococcus thermophilus* | YO9 | DSMZ | DSM 17844 | Dec. 21, 2005 | Anidral Srl |
| 47 | *Streptococcus thermophilus* | YO100 | DSMZ | DSM 17845 | Dec. 21, 2005 | Anidral Srl |
| 48 | *Lactobacillus fermentum* | LF06 | DSMZ | DSM 18295 | May 24, 2006 | Anidral Srl |
| 49 | *Lactobacillus fermentum* | LF07 | DSMZ | DSM 18296 | May 24, 2006 | Anidral Srl |
| 50 | *Lactobacillus fermentum* | LF08 | DSMZ | DSM 18297 | May 24, 2006 | Anidral Srl |
| 51 | *Lactobacillus fermentum* | LF09 | DSMZ | DSM 18298 | May 24, 2006 | Anidral Srl |
| 52 | *Lactobacillus gasseri* | LGS01 | DSMZ | DSM 18299 | May 24, 2006 | Anidral Srl |
| 53 | *Lactobacillus gasseri* | LGS02 | DSMZ | DSM 18300 | May 24, 2006 | Anidral Srl |
| 54 | *Lactobacillus gasseri* | LGS03 | DSMZ | DSM 18301 | May 24, 2006 | Anidral Srl |
| 55 | *Lactobacillus gasseri* | LGS04 | DSMZ | DSM 18302 | May 24, 2006 | Anidral Srl |
| 56 = 32 | *Bifidobacterium adolescentis* EI-3 *Bifidobacterium catenulatum* sp./ *pseudocatenulatum* EI-31, ID 09-255 | BA 03 | DSMZ | DSM 18350 | Jun. 15, 2006 | Anidral Srl |
| 57 = 43 | *Bifidobacterium adolescentis* EI-15 | BA 02 | DSMZ | DSM 18351 | Jun. 15, 2006 | Anidral Srl |
| 58 | *Bifidobacterium adolescentis* EI-18 *Bifidobacterium animalis* subsp. *lactis* EI-18, ID 09-256 | BA 05 | DSMZ | DSM 18352 | Jun. 15, 2006 | Anidral Srl |
| 59 | *Bifidobacterium catenulatum* EI-20 | BC 01 | DSMZ | DSM 18353 | Jun. 15, 2006 | Anidral Srl |
| 60 | *Streptococcus thermophilus* FRai | MO1 | DSMZ | DSM 18613 | Sep. 13, 2006 | Mofin Srl |
| 61 | *Streptococcus thermophilus* LB2bi | MO2 | DSMZ | DSM 18614 | Sep. 13, 2006 | Mofin Srl |
| 62 | *Streptococcus thermophilus* LRci | MO3 | DSMZ | DSM 18615 | Sep. 13, 2006 | Mofin Srl |

TABLE A-continued

| No. | Name | Trade name | Depository authority | Deposit number | Date of deposit | Proprietor |
|---|---|---|---|---|---|---|
| 63 | *Streptococcus thermophilus* FP4 | MO4 | DSMZ | DSM 18616 | Sep. 13, 2006 | Mofin Srl |
| 64 | *Streptococcus thermophilus* ZZ5F8 | MO5 | DSMZ | DSM 18617 | Sep. 13, 2006 | Mofin Srl |
| 65 | *Streptococcus thermophilus* TEO4 | MO6 | DSMZ | DSM 18618 | Sep. 13, 2006 | Mofin Srl |
| 66 | *Streptococcus thermophilus* S1ci | MO7 | DSMZ | DSM 18619 | Sep. 13, 2006 | Mofin Srl |
| 67 | *Streptococcus thermophilus* 641bi | MO8 | DSMZ | DSM 18620 | Sep. 13, 2006 | Mofin Srl |
| 68 | *Streptococcus thermophilus* 277A/1ai | MO9 | DSMZ | DSM 18621 | Sep. 13, 2006 | Mofin Srl |
| 69 | *Streptococcus thermophilus* 277A/2ai | MO10 | DSMZ | DSM 18622 | Sep. 13, 2006 | Mofin Srl |
| 70 | *Streptococcus thermophilus* IDC11 | MO11 | DSMZ | DSM 18623 | Sep. 13, 2006 | Mofin Srl |
| 71 | *Streptococcus thermophilus* ML3di | MO14 | DSMZ | DSM 18624 | Sep. 13, 2006 | Mofin Srl |
| 72 | *Streptococcus thermophilus* TEO3 | MO15 | DSMZ | DSM 18625 | Sep. 13, 2006 | Mofin Srl |
| 73 | *Streptococcus thermophilus* G62 | GG1 | DSMZ | DSM 19057 | Feb. 21, 2007 | Mofin Srl |
| 74 | *Streptococcus thermophilus* G1192 | GG2 | DSMZ | DSM 19058 | Feb. 21, 2007 | Mofin Srl |
| 75 | *Streptococcus thermophilus* GB18 | GG3 MO2 | DSMZ | DSM 19059 | Feb. 21, 2007 | Mofin Srl |
| 76 | *Streptococcus thermophilus* CCR21 | GG4 | DSMZ | DSM 19060 | Feb. 21, 2007 | Mofin Srl |
| 77 | *Streptococcus thermophilus* G92 | GG5 | DSMZ | DSM 19061 | Feb. 21, 2007 | Mofin Srl |
| 78 | *Streptococcus thermophilus* G69 | GG6 | DSMZ | DSM 19062 | Feb. 21, 2007 | Mofin Srl |
| 79 | *Streptococcus thermophilus* | YO 10 | DSMZ | DSM 19063 | Feb. 21, 2007 | Anidral Srl |
| 80 | *Streptococcus thermophilus* | YO 11 | DSMZ | DSM 19064 | Feb. 21, 2007 | Anidral Srl |
| 81 | *Streptococcus thermophilus* | YO 12 | DSMZ | DSM 19065 | Feb. 21, 2007 | Anidral Srl |
| 82 | *Streptococcus thermophilus* | YO 13 | DSMZ | DSM 19066 | Feb. 21, 2007 | Anidral Srl |
| 83 | *Weissella* ssp. WSP 01 | EX | DSMZ | DSM 19067 | Feb. 21, 2007 | Anidral Srl |
| 84 | *Weissella* ssp. WSP 02 | EX | DSMZ | DSM 19068 | Feb. 21, 2007 | Anidral Srl |
| 85 | *Lactobacillus* ssp. WSP 03 | EX | DSMZ | DSM 19069 | Feb. 21, 2007 | Anidral Srl |
| 86 | *Lactobacillus plantarum* LP 09 | OY | DSMZ | DSM 19070 | Feb. 21, 2007 | Anidral Srl |
| 87 | *Lactobacillus plantarum* LP 10 | OY | DSMZ | DSM 19071 | Feb. 21, 2007 | Anidral Srl |
| 88 | *Lactococcus lactis* | NS 01 | DSMZ | DSM 19072 | Feb. 21, 2007 | Anidral Srl |
| 89 | *Lactobacillus fermentum* | LF 10 | DSMZ | DSM 19187 | Mar. 20, 2007 | Anidral Srl |
| 90 | *Lactobacillus fermentum* | LF 11 | DSMZ | DSM 19188 | Mar. 20, 2007 | Anidral Srl |
| 91 | *Lactobacillus casei* ssp. *rhamnosus* | LR05 | DSMZ | DSM 19739 | Sep. 27, 2007 | Anidral Srl |
| 92 | *Bifidobacterium bifidum* | BB01 | DSMZ | DSM 19818 | Oct. 30, 2007 | Anidral Srl |
| 93 | *Lactobacillus delbrueckii* subsp. *bulgaricus* LD 01 | Lb | DSMZ | DSM 19948 | Nov. 28, 2007 | Anidral Srl |
| 94 | *Lactobacillus delbrueckii* subsp. *bulgaricus* LD 02 | Lb | DSMZ | DSM 19949 | Nov. 28, 2007 | Anidral Srl |
| 95 | *Lactobacillus delbrueckii* subsp. *bulgaricus* LD 03 | Lb | DSMZ | DSM 19950 | Nov. 28, 2007 | Anidral Srl |
| 96 | *Lactobacillus delbrueckii* subsp. *bulgaricus* LD 04 | Lb | DSMZ | DSM 19951 | Nov. 28, 2007 | Anidral Srl |
| 97 | *Lactobacillus delbrueckii* subsp. *bulgaricus* LD 05 | Lb | DSMZ | DSM 19952 | Nov. 28, 2007 | Anidral Srl |
| 98 | *Bifidobacterium pseudocatenulatum* | B660 | DSMZ | DSM 21444 | May 13, 2008 | Probiotical SpA |
| 99 | *Lactobacillus acidophilus* | LA02 | DSMZ | DSM 21717 | Aug. 6, 2008 | Probiotical SpA |
| 100 | *Lactobacillus paracasei* | LPC 08 | DSMZ | DSM 21718 | Aug. 6, 2008 | Probiotical SpA |
| 101 | *Lactobacillus pentosus* | LPS 01 | DSMZ | DSM 21980 | Nov. 14, 2008 | Probiotical SpA |
| 102 | *Lactobacillus rhamnosus* | LR 06 | DSMZ | DSM 21981 | Nov. 14, 2008 | Probiotical SpA |
| 103 | *Lactobacillus delbrueckii* ssp. *delbrueckii* | DSMZ 20074 | DSMZ | DSM 22106 | Dec. 10, 2008 | Probiotical SpA |
| 104 | *Lactobacillus plantarum* | LP1 | DSMZ | DSM 22107 | Dec. 10, 2008 | Probiotical SpA |
| 105 | *Lactobacillus salivarius* | LS01 | DSMZ | DSM 22775 | Jul. 23, 2009 | Probiotical SpA |
| 106 | *Lactobacillus salivarius* | LS03 | DSMZ | DSM 22776 | Jul. 23, 2009 | Probiotical SpA |
| 107 | *Bifidobacterium bifidum* | BB01 | DSMZ | DSM 22892 | Aug. 28, 2009 | Probiotical SpA |
| 108 | *Bifidobacterium bifidum* | | DSMZ | DSM 22893 | Aug. 28, 2009 | Probiotical SpA |
| 109 | *Bifidobacterium bifidum* | BB03 | DSMZ | DSM 22894 | Aug. 28, 2009 | Probiotical SpA |
| 110 | *Bifidobacterium lactis* | BS05 | DSMZ | DSM 23032 | Oct. 13, 2009 | Probiotical SpA |
| 111 | *Lactobacillus acidophilus* | LA 06 | DSMZ | DSM 23033 | Oct. 13, 2009 | Probiotical SpA |
| 112 | *Lactobacillus brevis* | LBR01 | DSMZ | DSM 23034 | Oct. 13, 2009 | Probiotical SpA |

TABLE A-continued

| No. | Name | Trade name | Depository authority | Deposit number | Date of deposit | Proprietor |
|---|---|---|---|---|---|---|
| 113 | Bifidobacterium animalis ssp. lactis | BS06 | DSMZ | DSM 23224 | Jan. 12, 2010 | Probiotical SpA |
| 114 | Bifidobacterium longum | BL04 | DSMZ | DSM 23233 | Jan. 12, 2010 | Probiotical SpA |
| 115 | Bifidobacterium longum | BL05 | DSMZ | DSM 23234 | Jan. 12, 2010 | Probiotical SpA |
| 116 | Bifidobacterium bifidum | MB 109 | DSMZ | DSM 23731 | Jun. 29, 2010 | Probiotical SpA |
| 117 | Bifidobacterium breve | MB 113 | DSMZ | DSM 23732 | Jun. 29, 2010 | Probiotical SpA |
| 118 | Bifidobacterium lactis | MB 2409 | DSMZ | DSM 23733 | Jun. 29, 2010 | Probiotical SpA |
| 119 | Lactobacillus reuteri | LRE01 | DSMZ | DSM 23877 | Aug. 5, 2010 | Probiotical SpA |
| 120 | Lactobacillus reuteri | LRE02 | DSMZ | DSM 23878 | Aug. 5, 2010 | Probiotical SpA |
| 121 | Lactobacillus reuteri | LRE03 | DSMZ | DSM 23879 | Aug. 5, 2010 | Probiotical SpA |
| 122 | Lactobacillus reuteri | LRE04 | DSMZ | DSM 23880 | Aug. 5, 2010 | Probiotical SpA |
| 123 | Lactobacillus paracasei ssp. paracasei | LPC09 | DSMZ | DSM 24243 | Nov. 23, 2010 | Probiotical SpA |
| 124 | Lactobacillus acidophilus | LA 07 | DSMZ | DSM 24303 | Nov. 23, 2010 | Probiotical SpA |
| 125 | Bifidobacterium bifidum | BB04 | DSMZ | DSM 24437 | Jan. 4, 2011 | Probiotical SpA |
| 126 | Lactobacillus crispatus | CRL 1251 | DSMZ | DSM 24438 | Jan. 4, 2011 | Probiotical SpA |
| 127 | Lactobacillus crispatus | CRL 1266 | DSMZ | DSM 24439 | Jan. 4, 2011 | Probiotical SpA |
| 128 | Lactobacillus paracasei | CRL 1289 | DSMZ | DSM 24440 | Jan. 4, 2011 | Probiotical SpA |
| 129 | Lactobacillus salivarius | CRL 1328 | DSMZ | DSM 24441 | Jan. 4, 2011 | Probiotical SpA |
| 130 | Lactobacillus gasseri | CRL 1259 | DSMZ | DSM 24512 | Jan. 25, 2011 | Probiotical SpA |
| 131 | Lactobacillus acidophilus | CRL 1294 | DSMZ | DSM 24513 | Jan. 25, 2011 | Probiotical SpA |
| 132 | Lactobacillus salivarius | LS04 | DSMZ | DSM 24618 | Mar. 2, 2011 | Probiotical SpA |
| 133 | Lactobacillus crispatus | LCR01 | DSMZ | DSM 24619 | Mar. 2, 2011 | Probiotical SpA |
| 134 | Lactobacillus crispatus | LCR02 | DSMZ | DSM 24620 | Mar. 2, 2011 | Probiotical SpA |
| 135 | Lacotbacillus acidophilus | LA09 | DSMZ | DSM 24621 | Mar. 2, 2011 | Probiotical SpA |
| 136 | Lactobacillus gasseri | LGS05 | DSMZ | DSM 24622 | Mar. 2, 2011 | Probiotical SpA |
| 137 | Lactobacillus paracasei | LPC11 | DSMZ | DSM 24623 | Mar. 2, 2011 | Probiotical SpA |
| 138 | Bifidobacterium infantis | BI 02 | DSMZ | DSM 24687 | Mar. 29, 2011 | Probiotical SpA |
| 139 | Bifidobacterium bifidum | BB 06 | DSMZ | DSM 24688 | Mar. 29, 2011 | Probiotical SpA |
| 140 | Bifidobacterium longum | BL 06 | DSMZ | DSM 24689 | Mar. 29, 2011 | Probiotical SpA |
| 141 | Bifidobacterium lactis | BS 07 | DSMZ | DSM 24690 | Mar. 29, 2011 | Probiotical SpA |
| 142 | Bifidobacterium longum | PCB133 | DSMZ | DSM 24691 | Mar. 29, 2011 | Probiotical SpA |
| 143 | Bifidobacterium breve | B632 | DSMZ | DSM 24706 | Apr. 7, 2011 | Probiotical SpA |
| 144 | Bifidobacterium breve | B2274 | DSMZ | DSM 24707 | Apr. 7, 2011 | Probiotical SpA |
| 145 | Bifidobacterium breve | B7840 | DSMZ | DSM 24708 | Apr. 7, 2011 | Probiotical SpA |
| 146 | Bifidobacterium longum | B1975 | DSMZ | DSM 24709 | Apr. 7, 2011 | Probiotical SpA |
| 147 | Lactobacillus salivarius | DLV1 | DSMZ | DSM 25138 | Sep. 2, 2011 | Probiotical SpA |
| 148 | Lactobacillus reuteri | LRE05 | DSMZ | DSM 25139 | Sep. 2, 2011 | Probiotical SpA |
| 149 | Lactobacillus reuteri | LRE06 | DSMZ | DSM 25140 | Sep. 2, 2011 | Probiotical SpA |
| 150 | Lactobacillus reuteri | RC 14 | DSMZ | DSM 25141 | Sep. 2, 2011 | Probiotical SpA |
| 151 | Streptococcus thermophilus | ST 10 | DSMZ | DSM 25246 | Sep. 19, 2011 | Probiotical SpA |
| 152 | Streptococcus thermophilus | ST 11 | DSMZ | DSM 25247 | Sep. 19, 2011 | Probiotical SpA |
| 153 | Streptococcus thermophilus | ST 12 | DSMZ | DSM 25282 | Oct. 20, 2011 | Probiotical SpA |
| 154 | Lactobacillus salivarius | DLV8 | DSMZ | DSM 25545 | Jan. 12, 2012 | Probiotical SpA |
| 155 | Bifidobacterium longum | DLBL 07 | DSMZ | DSM 25669 | Feb. 16, 2012 | Probiotical SpA |
| 156 | Bifidobacterium longum | DLBL 08 | DSMZ | DSM 25670 | Feb. 16, 2012 | Probiotical SpA |
| 157 | Bifidobacterium longum | DLBL 09 | DSMZ | DSM 25671 | Feb. 16, 2012 | Probiotical SpA |
| 158 | Bifidobacterium longum | DLBL 10 | DSMZ | DSM 25672 | Feb. 16, 2012 | Probiotical SpA |
| 159 | Bifidobacterium longum | DLBL 11 | DSMZ | DSM 25673 | Feb. 16, 2012 | Probiotical SpA |
| 160 | Bifidobacterium longum | DLBL 12 | DSMZ | DSM 25674 | Feb. 16, 2012 | Probiotical SpA |
| 161 | Bifidobacterium longum | DLBL 13 | DSMZ | DSM 25675 | Feb. 16, 2012 | Probiotical SpA |
| 162 | Bifidobacterium longum | DLBL 14 | DSMZ | DSM 25676 | Feb. 16, 2012 | Probiotical SpA |
| 163 | Bifidobacterium longum | DLBL 15 | DSMZ | DSM 25677 | Feb. 16, 2012 | Probiotical SpA |
| 164 | Bifidobacterium longum | DLBL 16 | DSMZ | DSM 25678 | Feb. 16, 2012 | Probiotical SpA |
| 165 | Bifidobacterium longum | DLBL 17 | DSMZ | DSM 25679 | Feb. 16, 2012 | Probiotical SpA |
| 166 | Lactobacillus johnsonii | DLLJO 01 | DSMZ | DSM 25680 | Feb. 16, 2012 | Probiotical SpA |
| 167 | Lactobacillus rhamnosus | DLLR 07 | DSMZ | DSM 25681 | Feb. 16, 2012 | Probiotical SpA |
| 168 | Lactobacillus rhamnosus | DLLR 08 | DSMZ | DSM 25682 | Feb. 16, 2012 | Probiotical SpA |
| 169 | Lactobacillus reuteri | DLLRE 07 | DSMZ | DSM 25683 | Feb. 16, 2012 | Probiotical SpA |
| 170 | Lactobacillus reuteri | DLLRE 08 | DSMZ | DSM 25684 | Feb. 16, 2012 | Probiotical SpA |
| 171 | Lactobacillus reuteri | DLLRE 09 | DSMZ | DSM 25685 | Feb. 16, 2012 | Probiotical SpA |
| 172 | Bifidobacterium longum | DLBL 18 | DSMZ | DSM 25708 | Feb. 24, 2012 | Probiotical SpA |
| 173 | Bifidobacterium infantis | BI 03 | DSMZ | DSM 25709 | Feb. 24, 2012 | Probiotical SpA |
| 174 | Lactobacillus plantarum | LP 09 | DSMZ | DSM 25710 | Feb. 24, 2012 | Probiotical SpA |
| 175 | Bifidobacterium longum | DLBL 19 | DSMZ | DSM 25717 | Mar. 1, 2012 | Probiotical SpA |
| 176 | Bifidobacterium longum | DLBL 20 | DSMZ | DSM 25718 | Mar. 1, 2012 | Probiotical SpA |
| 177 | Lactobacillus salivarius | LS 05 | DSMZ | DSM 26036 | Jun. 6, 2012 | Probiotical SpA |
| 178 | Lactobacillus salivarius | LS 06 | DSMZ | DSM 26037 | Jun. 6, 2012 | Probiotical SpA |
| 179 | Lactobacillus pentosus | LPS 02 | DSMZ | DSM 26038 | Jun. 6, 2012 | Probiotical SpA |
| 180 | Bifidobacterium pseudolongum ssp. globosum | BPS 01 | DSMZ | DSM 26456 | Oct. 2, 2012 | Probiotical SpA |
| 181 | Lactobacillus fermentum | LF15 | DSMZ | DSM 26955 | Mar. 1, 2013 | Probiotical SpA |
| 182 | Lactobacillus fermentum | LF16 | DSMZ | DSM 26956 | Mar. 1, 2013 | Probiotical SpA |
| 183 | Lactobacillus casei | LC03 | DSMZ | DSM 27537 | Jul. 24, 2013 | Probiotical SpA |
| 184 | Lactobacillus crispatus | LCR03 | DSMZ | DSM 27538 | Jul. 24, 2013 | Probiotical SpA |
| 185 | Lactobacillus jensenii | LJE01 | DSMZ | DSM 27539 | Jul. 24, 2013 | Probiotical SpA |

TABLE A-continued

| No. | Name | Trade name | Depository authority | Deposit number | Date of deposit | Proprietor |
|---|---|---|---|---|---|---|
| 186 | *Lactobacillus helveticus* ID 922 | LH01 | DSMZ | DSM 28153 | Dec. 4, 2013 | Probiotical SpA |
| 187 | *Lactobacillus helveticus* ID 923 | LH02 | DSMZ | DSM 28154 | Dec. 4, 2013 | Probiotical SpA |
| 188 | *Lactococcus lactis* ssp. *cremoris* ID 1612 | LLC02 | DSMZ | DSM 28155 | Dec. 4, 2013 | Probiotical SpA |
| 189 | *Lactococcus lactis* ssp. *cremoris* ID 1252 | LLC03 | DSMZ | DSM 28156 | Dec. 4, 2013 | Probiotical SpA |
| 190 | *Lactococcus lactis* ssp. *Lactis* ID 1254 | LLL01 | DSMZ | DSM 28157 | Dec. 4, 2013 | Probiotical SpA |
| 191 | *Bifidobacterium longum* | BL 01 | DSMZ | DSM 28173 | Dec. 11, 2013 | Probiotical SpA |
| 192 | *Bifidobacterium longum* | BL 02 | DSMZ | DSM 28174 | Dec. 11, 2013 | Probiotical SpA |
| 193 | *Bifidobaterium animalis* ssp. *lactis* | Bb1 | DSMZ | DSM 17850 | Dec. 23, 2005 | BioMan Srl |
| 194 | *Streptococcus thermophilus* | ST 16 BM | DSMZ | DSM 19526 | Jul. 13, 2007 | BioMan Srl |
| 195 | *Bifidobacterium infantis* | BI 04 | DSMZ | DSM 28651 | Apr. 8, 2014 | Probiotical SpA |
| 196 | *Bifidobacterium infantis* | BI 05 | DSMZ | DSM 28652 | Apr. 8, 2014 | Probiotical SpA |
| 197 | *Streptococcus thermophilus* | ST 15 | DSMZ | DSM 28911 | Jun. 11, 2014 | Probiotical SpA |
| 198 | *Streptococcus thermophilus* | ST 16 | DSMZ | DSM 28912 | Jun. 11, 2014 | Probiotical SpA |
| 199 | *Streptococcus thermophilus* | ST 17 | DSMZ | DSM 28913 | Jun. 11, 2014 | Probiotical SpA |
| 200 | *Lactobacillus fermentum* | LF18 | DSMZ | DSM 29197 | Jul. 30, 2014 | Probiotical SpA |
| 201 | *Lactobacillus fermentum* | LF19 | DSMZ | DSM 29198 | Jul. 30, 2014 | Probiotical SpA |
| 202 | *Leuconostoc* sp. | LM01 | DSMZ | DSM 29372 | Sep. 10, 2014 | Mofin Srl |
| 203 | *Leuconostoc* sp. | LM10 | DSMZ | DSM 29373 | Sep. 10, 2014 | Mofin Srl |
| 204 | *Leuconostoc* sp. | LM11 | DSMZ | DSM 29374 | Sep. 10, 2014 | Mofin Srl |
| 205 | *Leuconostoc* sp. | LM12 | DSMZ | DSM 29375 | Sep. 10, 2014 | Mofin Srl |
| 206 | *Lactobacillus plantarum* | LP10 | DSMZ | DSM 29389 | Sep. 10, 2014 | Mofin Srl |
| 207 | *Lactobacillu splantarum* | LP11 | DSMZ | DSM 29390 | Sep. 10, 2014 | Mofin Srl |
| 208 | *Lactobacillus plantarum* | LP12 | DSMZ | DSM 29400 | Sep. 10, 2014 | Mofin Srl |
| 209 | *Lactobacillus plantarum* | LP13 | DSMZ | DSM 29401 | Sep. 10, 2014 | Mofin Srl |
| 210 | *Lactobacillus pentosus* | LPS03 | DSMZ | DSM 29402 | Sep. 10, 2014 | Mofin Srl |
| 211 | *Lactobacillus reuteri* | LRE10 | DSMZ | DSM 29403 | Sep. 10, 2014 | Mofin Srl |
| 212 | *Lactobacillus brevis* | LBRO2 | DSMZ | DSM 29404 | Sep. 10, 2014 | Mofin Srl |
| 213 | *Lactobacillus salivarius* | LS 07 | DSMZ | DSM 29476 | Oct. 9, 2014 | Probiotical SpA |
| 214 | *Bifidobacterium breve* | BR 05 | DSMZ | DSM 29494 | Oct. 9, 2014 | Probiotical SpA |
| 215 | *Lactococcus lactis* ssp. *cremoris* | L0002 | DSMZ | DSM 29536 | Oct. 22, 2014 | Probiotical SpA |
| 216 | *Bifidobacterium longum* | BL 21 | DSMZ | DSM 29884 | Jan. 15, 2015 | Probiotical SpA |
| 217 | *Lactobacillus rhamnosus* | LR 09 | DSMZ | DSM 29885 | Jan. 15, 2015 | Probiotical SpA |
| 218 | *Lactobacillus kefiri* | LKE01 | DSMZ | DSM 32027 | Apr. 8, 2015 | Probiotical SpA |
| 219 | *Lactobacillus kefiri* | LKE02 | DSMZ | DSM 32056 | May 29, 2015 | Probiotical SpA |
| 220 | *Lactobacillus acidophilus* | LA10 | DSMZ | DSM 32075 | Jul. 3, 2015 | Probiotical SpA |
| 221 | *Lactobacillus kefiranofaciens* | LKR01 | DSMZ | DSM 32076 | Jul. 3, 2015 | Probiotical SpA |
| 222 | *Lactobacillus kefiri* | LKF01 | DSMZ | DSM 32079 | Jul. 10, 2015 | Probiotical SpA |
| 223 | *Lactobaciullus kefiri* | LKF02 | DSMZ | DSM 32080 | Jul. 10, 2015 | Probiotical SpA |
| 224 | *Streptococcus thermophilus* | ST18 | DSMZ | DSM 32134 | Sep. 3, 2015 | Mofin S.r.l. |
| 225 | *Streptococcus thermophilus* | ST19 | DSMZ | DSM 32135 | Sep. 3, 2015 | Mofin S.r.l. |
| 226 | *Streptococcus thermophilus* | ST20 | DSMZ | DSM 32136 | Sep. 3, 2015 | Mofin S.r.l. |
| 227 | *Streptococcus thermophilus* | ST21 | DSMZ | DSM 32137 | Sep. 3, 2015 | Mofin S.r.l. |
| 228 | *Streptococcus thermophilus* | ST22 | DSMZ | DSM 32138 | Sep. 3, 2015 | Mofin S.r.l. |
| 229 | *Streptococcus thermophilus* | ST23 | DSMZ | DSM 32139 | Sep. 3, 2015 | Mofin S.r.l. |
| 230 | *Streptococcus thermophilus* | ST24 | DSMZ | DSM 32140 | Sep. 3, 2015 | Mofin S.r.l. |
| 231 | *Lactobacillus salivarius* | LS02 | DSMZ | DSM 32204 | Nov. 13, 2015 | Probiotical SpA |
| 232 | *Weissella confusa* | WC01 | DSMZ | DSM 32156 | Sep. 22, 2015 | Mofin S.r.l. |
| 233 | *Weissella confusa* | WC02 | DSMZ | DSM 32157 | Sep. 22, 2015 | Mofin S.r.l. |
| 234 | *Lactobacillus curvatus* | LCU01 | DSMZ | DSM 32160 | Sep. 22, 2015 | Mofin S.r.l. |
| 235 | *Lactobacillus plantarum* | LMC1 | DSMZ | DSM 32252 | Jan. 29, 2016 | Probiotical SpA |
| 236 | *Lactobacillus reuteri* | LMC3 | DSMZ | DSM 32253 | Jan. 29, 2016 | Probiotical SpA |
| 237 | *Lactobacillus parasei* | LMC4 | DSMZ | DSM 32254 | Jan. 29, 2016 | Probiotical SpA |
| 238 | *Lactobacillus reuteri* | LMC5 | DSMZ | DSM 32255 | Jan. 29, 2016 | Probiotical SpA |
| 239 | *Lactobacillus rhamnosus* | LMC6 | DSMZ | DSM 32256 | Jan. 29, 2016 | Probiotical SpA |
| 240 | *Lactobacillus rhamnosus* | LMC7 | DSMZ | DSM 32257 | Jan. 29, 2016 | Probiotical SpA |
| 241 | *Lactobacillus paracasei* | LMC8 | DSMZ | DSM 32258 | Jan. 29, 2016 | Probiotical SpA |
| 242 | *Lactobacillus reuteri* | LMC9 | DSMZ | DSM 32259 | Jan. 29, 2016 | Probiotical SpA |
| 243 | *Lactobacillus rhamnosus* | LMC10 | DSMZ | DSM 32260 | Jan. 29, 2016 | Probiotical SpA |
| 244 | *Lactobacillus fermentum* | LF25 | DSMZ | DSM 32275 | Mar. 15, 2016 | Probiotical SpA |
| 245 | *Lactobacillus fermentum* | LF5 | DSMZ | DSM 32277 | Mar. 18, 2016 | Probiotical SpA |
| 246 | *Lactobacillus fermentum* | LF20 | DSMZ | DSM 32288 | Apr. 14, 2016 | Probiotical SpA |
| 247 | *Bifidobacterium animalis* ssp. *lactis* | BS08 | DSMZ | DSM 32374 | Sep. 30, 2016 | Probiotical SpA |
| 248 | *Bifidobacterium animalis* ssp. *Lactis* | BS09 | DSMZ | DSM 32404 | Dec. 15, 2016 | Probiotical SpA |
| 249 | *Lactobacillus gasseri* | LGS06 | DSMZ | DSM 32405 | Dec. 15, 2016 | Probiotical SpA |
| 250 | *Lactobacillus helveticus* | LH03 | DSMZ | DSM 32406 | Dec. 15, 2016 | Probiotical SpA |
| 251 | *Bifidobacterium adolescentis* | BA06 | DSMZ | DSM 32479 | Apr. 7, 2017 | Probiotical SpA |
| 252 | *Bifidobacterium bifidum* | BB07 | DSMZ | DSM 32480 | Apr. 7, 2017 | Probiotical SpA |
| 253 | *Bifidobacterium bifidum* | BB08 | DSMZ | DSM 32481 | Apr. 7, 2017 | Probiotical SpA |

TABLE A-continued

| No. | Name | Trade name | Depository authority | Deposit number | Date of deposit | Proprietor |
|---|---|---|---|---|---|---|
| 254 | *Bifidobacterium longum* | BL22 | DSMZ | DSM 32482 | Apr. 7, 2017 | Probiotical SpA |
| 255 | *Bifidobacterium longum* | BL23 | DSMZ | DSM 32483 | Apr. 7, 2017 | Probiotical SpA |
| 256 | *Bifidobacterium adolescentis* | BA07 | DSMZ | DSM 32491 | Apr. 21, 2017 | Probiotical SpA |
| 257 | *Lactobacillus casei* | LC04 | DSMZ | DSM 33400 | Jan. 16, 2020 | Probiotical SpA |
| 258 | *Bifidobacterium bifidum* | BB09 | DSMZ | DSM 33396 | Jan. 16, 2020 | Probiotical SpA |
| 259 | *Lactobacillus plantarum* | LP14 | DSMZ | DSM 33401 | Jan. 16, 2020 | Probiotical SpA |
| 260 | *Lactobacillus fermentum* | LP26 | DSMZ | DSM 33402 | Jan. 16, 2020 | Probiotical SpA |
| 261 | *Lactobacillus crispatus* | LCR04 | DSMZ | DSM 33487 | Apr. 2, 2020 | Probiotical SpA |

The invention claimed is:

1. A process for the preparation of a stable and functional homogenate of bacterial strains comprising cellular components, wherein said process comprises the following steps:
    preparing at least one cell strain of freeze-dried bacteria;
    re-hydrating—in a hydrating fluid—said bacterial cell strain freeze-dried at a temperature comprised from 15° C. to 35° C., to obtain a volume of a biomass of said bacterial cell strain;
    subjecting said volume of said biomass to a pressure homogenisation step in a pressure homogeniser to obtain a homogenate in liquid form comprising cellular components of said bacterial cells, wherein said cellular components comprise a peptidoglycan, and wherein said homogenisation step is carried out at an operating pressure comprised from 1200 bar to 2000 bar;
    spraying said homogenate in liquid form to obtain a homogenate in solid form comprising said cellular components, wherein said homogenate in solid form comprises said peptidoglycan at an initial amount comprised from 5% to 40% by weight, with respect to the weight of the homogenate in solid form.

2. The process according to claim 1, wherein said pressure homogenisation step is carried out at an operating pressure comprised from 1500 bar to 2000 bar.

3. The process according to claim 1, wherein said pressure homogenisation step comprises at least one processing cycle, wherein in said at least one processing cycle comprises the following steps of:
    loading the whole of said biomass volume into a homogeniser valve of said pressure homogeniser and subjecting said biomass to at least one pressure change by means of a discontinuous pump which produces a primary pressure comprised in a range from 1200 bar to 2000 bar, preferably from 1500 bar to 2000 bar, alternating with a secondary pressure comprised in a range from 50 bar to 200 bar, preferably from 100 bar to 150 bar, to obtain a homogenate in liquid form of said at least one processing cycle; and
    transferring said homogenate in liquid form of said at least one processing cycle into a collection container.

4. The process according to claim 3, wherein said homogenisation step comprises from 1 to 10 of said at least one processing cycle, preferably from 4 to 8, more preferably from 3 to 6, wherein said processing cycles are carried out continuously and under the same operating conditions, and wherein at each subsequent cycle said homogenate in liquid form of said at least one processing cycle in said collection container is loaded into said homogeniser valve.

5. The process according to claim 3, wherein said step of loading the whole of said biomass volume into said homogeniser valve is carried out by dividing said volume into portions and loading said portions into the homogeniser valve in consecutive steps until said whole of said volume is loaded.

6. The process according to claim 1, wherein said homogenate in solid form comprises said peptidoglycan at an initial amount comprised from 10% to 30% by weight, preferably from 15% to 25% by weight, with respect to the weight of the homogenate in solid form.

7. The process according to claim 1, wherein in said step of hydrating said bacterial cell strain in a hydrating fluid freeze-dried to obtain said biomass volume of said bacterial cell strain, said biomass volume has a concentration of bacteria comprised from $10\times10^9$ to $500\times10^9$ AFU, preferably from $100\times10^9$ to $300\times10^9$, preferably wherein said concentration is measured by means of cytofluorimetry.

8. The process according to claim 1, wherein said process comprises, before the spraying step, a step of subjecting said homogenate in liquid form comprising cellular components to a cryoprotection step, wherein in said cryoprotection step a liquid solution comprising a cryoprotectant is added to said homogenate in liquid form to obtain a cryoprotected homogenate in liquid form; preferably wherein said cryoprotectant comprises at least one sugar, preferably sucrose, and at least one phosphoric acid salt of an alkaline or alkaline-earth metal, preferably wherein said alkaline or alkaline-earth metal is selected from sodium, potassium, calcium and magnesium.

* * * * *